United States Patent
Paros et al.

(10) Patent No.: US 10,859,122 B2
(45) Date of Patent: Dec. 8, 2020

(54) SPLINE DRIVE DRILL STEEL COUPLERS

(71) Applicant: Kennametal Inc., Latrobe, PA (US)

(72) Inventors: Nicholas J. Paros, Johnstown, PA (US); Robbie Bloom, Hooversville, PA (US)

(73) Assignee: KENNAMETAL INC., Latrobe, PA (US)

( * ) Notice: Subject to any disclaimer, the term of this patent is extended or adjusted under 35 U.S.C. 154(b) by 712 days.

(21) Appl. No.: 15/686,868

(22) Filed: Aug. 25, 2017

(65) Prior Publication Data

US 2019/0063504 A1    Feb. 28, 2019

(51) Int. Cl.
*F16D 1/02* (2006.01)
*F16D 1/10* (2006.01)
*E21D 21/00* (2006.01)

(52) U.S. Cl.
CPC ........... *F16D 1/10* (2013.01); *E21D 21/0093* (2013.01); *F16D 1/02* (2013.01); *F16D 1/101* (2013.01); *F16D 2001/103* (2013.01)

(58) Field of Classification Search
CPC .............. F16D 1/10; F16D 1/101; F16D 1/02
USPC ......................................................... 403/298
See application file for complete search history.

(56) References Cited

U.S. PATENT DOCUMENTS

| | | | |
|---|---|---|---|
| 1,923,328 A | 8/1933 | Reed | |
| 2,332,070 A | 10/1943 | Gillerstrom | |
| 4,357,137 A * | 11/1982 | Brown | F16D 3/06 464/75 |
| 4,662,775 A * | 5/1987 | Faul | B62D 1/10 403/365 |
| 4,792,320 A * | 12/1988 | Nickel | F16D 3/387 464/181 |
| 4,834,594 A | 5/1989 | Morgan | |
| 4,907,660 A | 3/1990 | Staggs | |
| 5,064,002 A | 11/1991 | Patterson | |
| 6,109,620 A | 8/2000 | Roberts | |
| 6,367,567 B1 | 4/2002 | Massa | |
| 2004/0131419 A1* | 7/2004 | Hammond | E04G 21/10 403/298 |

(Continued)

FOREIGN PATENT DOCUMENTS

EP    0198809 A2    10/1986

*Primary Examiner* — Daniel J Wiley
(74) *Attorney, Agent, or Firm* — Larry R. Meenan (57) ABSTRACT

An assembly which includes a first member with torque transmission elements, and a coupler which connects together, in a rotatably driving relationship, the first member and a second member. The coupler includes an intermediate section disposed between an axial forward end and an axial rearward end of the coupler, a forward section extending between the intermediate section and the axial forward end, and a rearward section extending between the intermediate section and the axial rearward end. The intermediate section includes torque transmission elements for engaging with the torque transmission elements of the first member, to facilitate transmission of torque from the first member to the coupler. The torque transmission elements of the coupler are automatically brought into a torque-transmitting relationship with the torque transmission elements of the first member when the coupler is engaged with the first member. Other variants and embodiments are broadly contemplated herein.

24 Claims, 7 Drawing Sheets

(56) References Cited

U.S. PATENT DOCUMENTS

2013/0008721 A1 1/2013 Seegmiller
2013/0114999 A1 5/2013 Ã-stling
2014/0262534 A1 9/2014 Cox

* cited by examiner

SPLINE DRIVE DRILL STEEL COUPLERS

BACKGROUND

The expansion of an underground mine (e.g., a coal mine) involves digging or extending a tunnel (or passage) that initially has an unsupported roof. To stabilize and support the roof of the tunnel or passage, a roof bolt is normally inserted into the roof at a variety of locations. (A similar procedure can also be undertaken for the roof of a pre-existing tunnel or passage, to provide additional roof support.)

To this end, an operator typically drills corresponding holes in the roof via a rotatable cutting bit or roof drill bit. A roof bolt is then inserted into each one of the holes. Typically, the bore holes may extend between two feet and greater than twenty feet into the roof, and each bore hole is typically filled with resin (at least over a portion thereof) to help fix the corresponding roof bolt therewithin. A roof support, such as a roof panel (e.g., a rectilinear metal plate), is then attached to a lower end of the roof bolt. Support is effectively provided to the roof via a compressive force applied thereto by the roof panel, not only along a direction parallel to the roof bolt but also over a great range of directions radiating from the area of contact between the roof support and the roof.

The roof drill bit, typically including one or more cutting edges (or cutting media) suitable for drilling into rock strata, is usually connected to a machine that rotates the bit via the interposition of a "drill steel". The drill steel is typically an elongated rod with a given external and internal cross-sectional shape (conventionally, e.g., hexagonal for both). Thus, the roof drill bit connects to the drill steel at the distal (or upper) end of the latter, and the drill steel connects at its proximal (lower) end to the machine that rotationally drives the drill steel (and thus, by extension, the roof drill bit).

Interconnections between the above-mentioned components are often rendered via a separate "coupler" component (or other type of intermediary coupling); alternatively, adjacent components can be directly connected to one another without an intervening component. In a conventional arrangement, the drill steel (e.g., having a hexagonal outer cross-sectional shape) is inserted into a chuck having a compatibly shaped (e.g., hexagonal) bore or recess, wherein the chuck itself is connected to or integral with the rotational drive. This facilitates the provision of a torque to the drill steel, which then transferred to the (connected) roof drill bit. Once a bolt hole is drilled using the assembly of chuck-drill steel-coupler-drill bit, the rotational drive (or a chuck connected/integrated therewith) is lowered from the ceiling, and the drill steel and drill bit normally follow under the influence of gravity. In arrangements that involve the use of a coupler between the chuck and drill steel, the coupler has an external profile (e.g., generally hexagonal) that engages with a compatible inner profile of the drill steel; such a coupler can be inserted into (or engaged with) a chuck via given profiles provided on both. Generally, significant manual intervention is required to engage the coupler or a drill steel with a chuck in the manners just noted.

Problems and inconveniences thus can often be encountered in connection with conventional arrangements as discussed above. For instance, beyond the considerable operator intervention often required in assembling and operating the noted combinations of components, some coupling connections might often impart inadequate strength for rotationally driving the drill steel under typical operating conditions.

SUMMARY

In summary, one aspect of the invention provides an assembly comprising: a first member comprising torque transmission elements; a coupler for connecting together, in a rotatably driving relationship, the first member and a second member; the coupler comprising: an axial forward end and an axial rearward end; an intermediate section disposed between the axial forward end and the axial rearward end; a forward section extending between the intermediate section and the axial forward end; and a rearward section extending between the intermediate section and the axial rearward end; the intermediate section comprising torque transmission elements for engaging with the torque transmission elements of the first member, to facilitate transmission of torque from the first member to the coupler; wherein the torque transmission elements of the coupler are automatically brought into a torque-transmitting relationship with the torque transmission elements of the first member when the coupler is engaged with the first member.

Another aspect of the invention provides a coupler for connecting together, in a driving relationship, a first member and a second member in a rotatable cutter assembly, the coupler comprising: an axial forward end and an axial rearward end; an intermediate section disposed between the axial forward end and the axial rearward end; a forward section extending between the intermediate section and the axial forward end; a rearward section extending between the intermediate section and the axial rearward end; the intermediate section comprising torque transmission elements for engaging with compatible elements of the first member, to facilitate transmission of torque from the first member to the coupler; wherein the torque transmission elements automatically are brought into a torque-transmitting relationship with the compatible elements of the first member when the coupler is engaged with the first member.

An additional aspect of the invention provides an assembly comprising: a first member comprising torque transmission elements; a coupler for connecting together, in a rotatably driving relationship, the first member and a second member; the coupler comprising torque transmission elements for engaging with the torque transmission elements of the first member, to facilitate transmission of torque from the first member to the coupler; wherein the torque transmission elements of the coupler are automatically brought into a torque-transmitting relationship with the torque transmission elements of the first member when the coupler is engaged with the first member.

For a better understanding of exemplary embodiment of the invention, together with other and further features and advantages thereof, reference is made to the following description, takin in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Broadly contemplated herein, in accordance with at least one embodiment, are methods and arrangements which permit automatic alignment of a drill steel with respect to a chuck, e.g., via use of an intermediary coupler. Such a coupler, itself engaged with a drill steel, may include angled splines which engage with straight recesses in the chuck, thereby permitting the aforementioned automatic alignment while maintaining strength to drive the drill steel. These and other features, and variants, will be better understood from the ensuing discussion.

Figure 1:
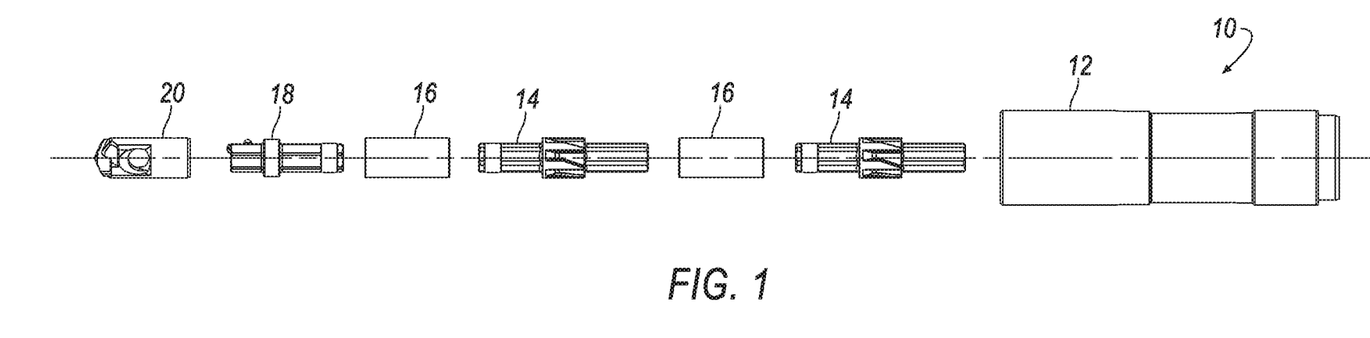
FIG. 1 provides an exploded, elevational view of a roof drill bit assembly.

FIG. 1 provides an exploded, elevational view of a roof drill bit assembly 10, in accordance with at least one embodiment. As shown, the roof drill bit assembly 10 includes a chuck adapter (or chuck) generally indicated at 12, which itself can be connected to or integral with a rotational drive. Assembly 10 also includes a pair of spline couplers (each one of which is generally designated as 14), a pair of drill steels (each one of which is generally indicated at 16), a coupling element (which can also be termed a "bit coupler") generally indicated at 18, and a roof drill bit generally indicated at 20.

While the components of the roof drill bit assembly 10 in FIG. 1 are exploded along a common longitudinal axis for sake of clarity, it should be appreciated that for the purpose of operation, these components would be assembled together to form an assembled roof drill bit assembly. Further, the drill steels 16 are shown here in a longitudinally shortened form (proportionally with respect to other components), which may not necessarily correspond to their actual length in implementation; as can be appreciated, in many implementations such drill steels 16 in fact can proportionally extend over a very significant longitudinal dimension as compared to other components in the assembly 10. Additionally, it is merely for the sake of illustration that there are two spline couplers 14 and two drill steels 16 shown; it can be appreciated that in variant embodiments there may be only one of each of those components, or possibly three or more of each of those components. (It should be noted that the term "spline coupler" is used herein for general reference to components indicated at 14 in FIGS. 1-6D and at 114 in FIGS. 7 and 8; however, it should be understood that a great variety of configurations are possible for components so referenced, and need not necessarily involve the use of "splines". Accordingly, the term "spline coupler" may be considered to be broadly interchangeable herein with "coupler".)

As shown, the bit coupler 18 directly interconnects a drill steel 16 and the drill bit 20. As is generally known, there may be an adapter additionally interposed between the bit coupler 18 and the drill bit 20, but in the present example there is a form-fitting connection between the two components. This is merely shown for the purpose of illustration, and it should be appreciated that any of a very wide variety of implementations may be employed for interconnecting bit coupler 18 and drill bit 20. For its part, the drill bit 20 itself may be configured in essentially any suitable manner for the implementation at hand (e.g., drilling into and through rock strata in a mine).

Figure 2:
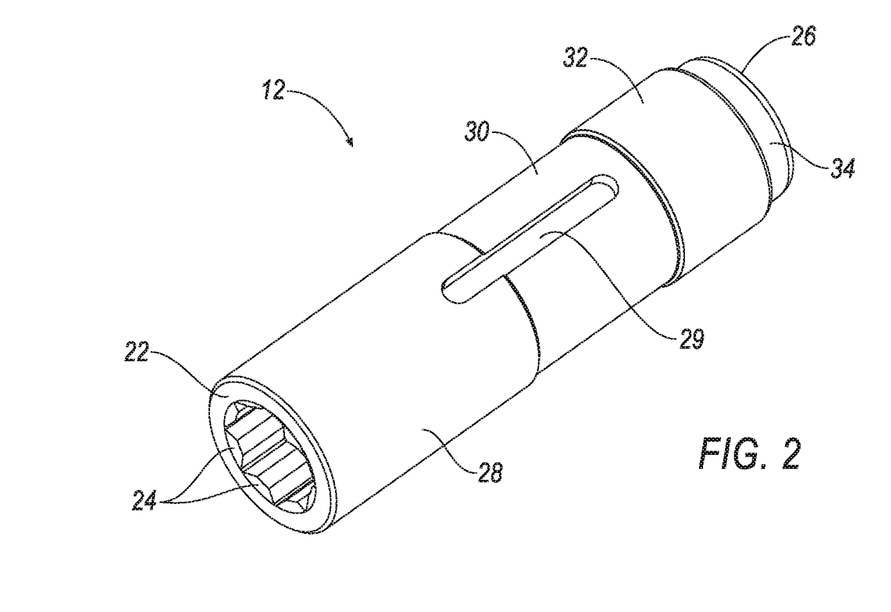
FIG. 2 provides a right isometric view of a chuck.
Figure 3A:
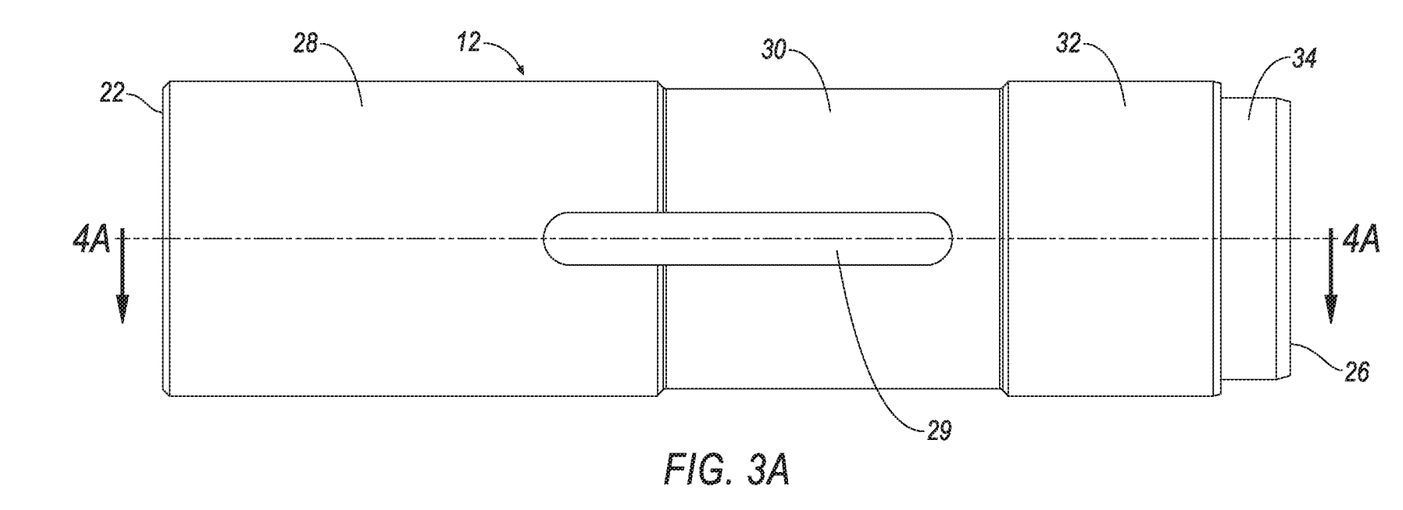
FIGS. 3A and 3B, respectively, provide an elevational view and a top view of the chuck of FIG. 2.
Figure 3B:
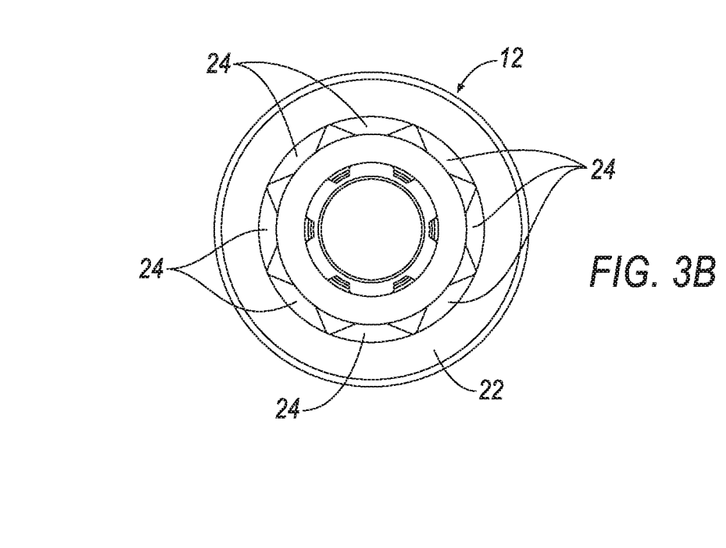

FIG. 2 provides a right isometric view of a chuck 12, in accordance with at least one embodiment, while FIGS. 3A and 3B, respectively, provide an elevational view and a top (left side) view of the chuck of FIG. 2. Reference may continue to be made to all of FIGS. 2-3B.

Toward an axial forward, or "top" end 22 of the chuck 12, a set of inwardly directed protrusions 24 (or "points"), disposed about an inner circumference of the chuck 12 may be provided, as generally known, for engaging a roof bolt (e.g., having a square cross-section) that is to be installed in a drilled hole. In a manner to be appreciated more fully herebelow, the forward end 22 is also dimensioned appropriately, internally, to accommodate a spline coupler as broadly contemplated herein. Here, merely by way of example, eight protrusions 24 are shown, each defined by an innermost arcuate surface and a pair of sloped side surfaces extending radially outwardly, from each end of the arcuate surface.

At an axial rearward, or "bottom" end 26 of chuck 12, a rotational drive can be accommodated in suitable manner. Further, the exterior of chuck 12 may be defined via four sections as shown, progressing from forward end 22 to rearward end 26: a first section 28, of generally greater outer diameter; a second section 30, having a slightly reduced outer diameter; a third section 32, having a similar outer diameter as first section 28; and a fourth section 34, having an outer diameter slightly reduced from the second section 30. For its part, fourth section 34 may include a terminal bevel, as shown, adjacent to the rearward end 26 of the chuck 12. Generally, the relative outer diameters here are mainly of relevance in fitting chuck 12 into a rotational drive, and can be tailored in any manner deemed suitable. For instance, the reduced diameter of second section 30 can help provide clearance for a chuck key; a longitudinal slot 29 (as shown), bridging sections 28 and 30, can accommodate the key. (Two such longitudinal slots 29 may be provided, at diametrically opposite sides of chuck 12.)

Figure 4A:
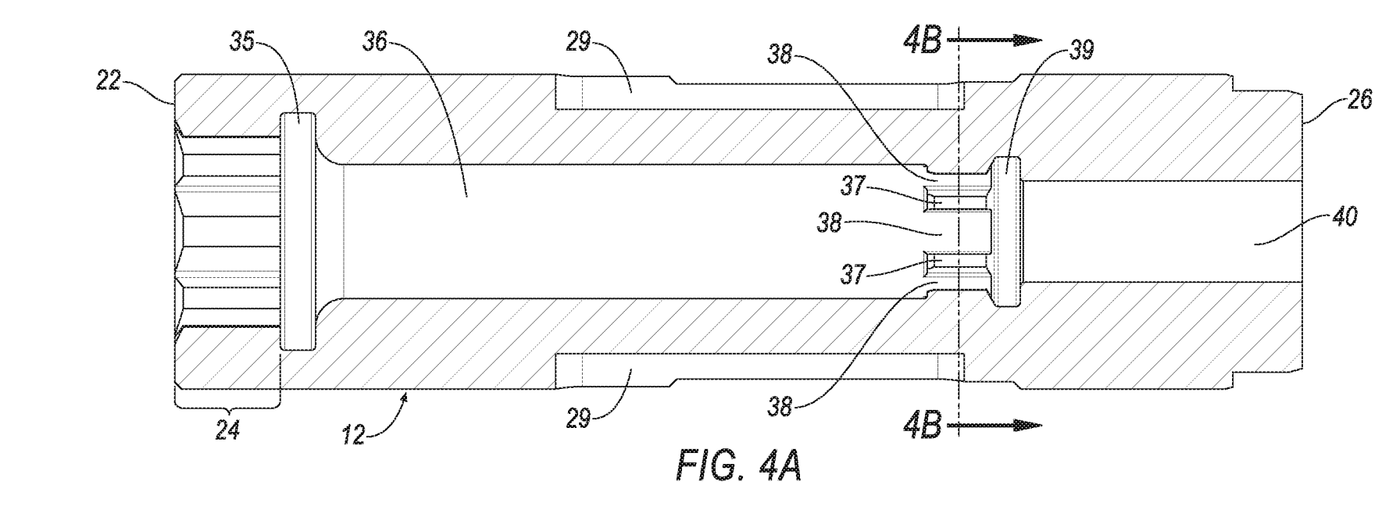
FIG. 4A provides an axial section taken through the line 4A-4A in FIG. 3A.
Figure 4B:
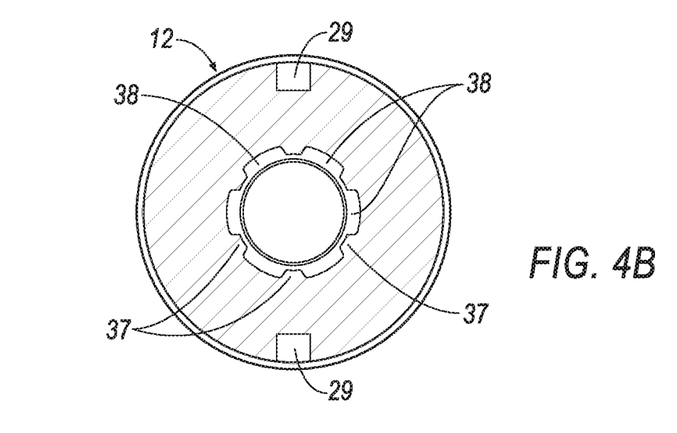
FIG. 4B provides a complete transverse section taken through the line 4B-4B in FIG. 4A.

FIG. 4A provides an axial section taken through the line 4A-4A in FIG. 3A, while FIG. 4B provides a complete transverse section taken through the line 4B-4B in FIG. 4A. Reference may continue to be made to both of FIGS. 4A and 4B.

As shown, a central longitudinal bore is generally defined via several sections, from forward end 22 to rearward end 26, via: the region of protrusions 24; a first annular chamber 35; a first bore portion 36; a spline portion which includes axial splines 37 and axial recesses 38 for accommodating a spline coupler; a second annular chamber 39; and a second bore portion 40. As shown, the first bore portion is of reduced inner diameter in comparison with the region of protrusions 24 and the first annular chamber 35. Further, the second annular chamber 39 is of similar or slightly greater diameter than the first bore portion 36.

Generally, the annular chambers 35 and 39 are present to provide clearances for manufacturing tools (e.g. broaches) during formation of the chuck 12. Additionally, a lower axial end of chamber 39 (toward the right in FIG. 4A), which results in an annular shoulder adjacent the smaller-diameter second bore portion 40, can serve as a stop for a coupler (such as that referred to herethroughout as coupler 14/114). Further, first bore portion 36 preferably is cylindrical in shape, so as to better accommodate a drill steel with a cylindrical outer surface. This represents a distinction over chucks with hexagonal inner profiles, which accommodate drill steels with hexagonal outer profiles, as known conventionally; it has been found that drill steels with round or cylindrical outer profiles present several advantages, such as a quieter mode of operation, as compared to drill steels with hexagonal outer profiles. Thus, with first bore portion 36 itself having a cylindrical inner surface, it will be better configured to receive and support (or "hug") a drill steel with a round or cylindrical outer profile.

Between the first bore portion and the second annular chamber 39, the recesses 38, at radially outermost portions thereof, may essentially be flush with the cylindrical wall defining first bore portion 36, while the splines 37 may extend a given distance radially inwardly. In the present example, six each of the splines 37 and recesses 38 are provided, but other quantities of the splines 37 and recesses 38 can be provided in at least one variant (e.g., four or five each, or less, of the splines 37 and recesses 38, or seven or eight or more each of the splines 37 and recesses 38).

Generally, and in a manner that will be better appreciated from further discussion below, splines 37 and recesses 38 may preferably be disposed and dimensioned in a manner that is spatially sufficient for accommodating splines (or other protrusive elements) of a coupler, while maintaining sufficient strength for transmitting torque to the coupler. Thus, for example, the splines 37 may each be of sufficiently small width (as measured in a circumferential direction of chuck 12) to permit greater (intervening) width for recesses 38, while still each wide enough so as to be readily formed (e.g., forged) and to sufficiently transmit torque between a rotational drive and a coupler. Each spline 37, as well, may have an axial forward end surface of predetermined shape that lends itself to an ease in formation and/or operation (e.g., that may be run parallel to a circumferential direction of chuck 12, or may be rounded).

In accordance with at least one embodiment, the splines 37 extend axially (e.g., substantially in a manner as shown), and each are of constant cross-section (with respect to a circumferential direction of the chuck 12) from one axial end to the other. As can be appreciated from FIGS. 4A and 4B, each spline 37 may have a generally trapezoidal cross-section, with respect to a circumferential direction of the chuck 12, such that its width (measured circumferentially), at least over part of the spline 37, tapers radially inwardly; this permits each recess 38 to have a width (measured circumferentially) that essentially remains constant from a radially outermost region thereof to a radially innermost region thereof, or may even diverge (increase) in that direction.

In accordance with at least one variant, each of the splines 37 need not be of constant cross-section from one axial end to the other. In accordance with at least one other variant, the splines 37 (whether of constant or varying cross-section) need not have straight or rounded axial forward end surfaces as discussed above. Particularly, such (axial forward end) surfaces may be angled along a circumferential direction, e.g., to match the angle of an angled wall portion of an intermediate section of a coupler (e.g., an angled wall portion 60 of an intermediate section 48 of a coupler 14, as discussed further below).

In accordance with at least one other variant, other protrusive elements may be used in place of axial splines. For instance, smaller protrusions (or protrusive elements) of a given thickness and with a given cross-sectional profile (e.g., circular, elliptical, square, rectangular, etc.), with less of a relative axial length than the splines 37 shown in FIG. 4A, and still of sufficient strength as to transmit torque from the chuck 12 to a coupler, may be employed. By way of an illustrative and non-restrictive example of such a variant, it is possible to drill radially-oriented holes through the chuck 12 (e.g., into a region of the chuck 12 where there is initially an uninterrupted inner cylindrical surface defining a bore or bore portion), and insert pins into those (drilled) holes to serve a similar or analogous purpose as splines 37. Sufficient strength and rigidity of such pins can be ensured, e.g., via a tight press-fit with respect to the holes. Such pins could be cylindrical in shape, but pins or elements with other two- or three-dimensional shapes can be employed to serve a similar or analogous purpose. Generally, any reference made herein to "splines" of the chuck (e.g., as indicated at 37) may be considered to be interchangeable with "protrusive elements" that can be configured in essentially any manner as just discussed.

Figure 5:
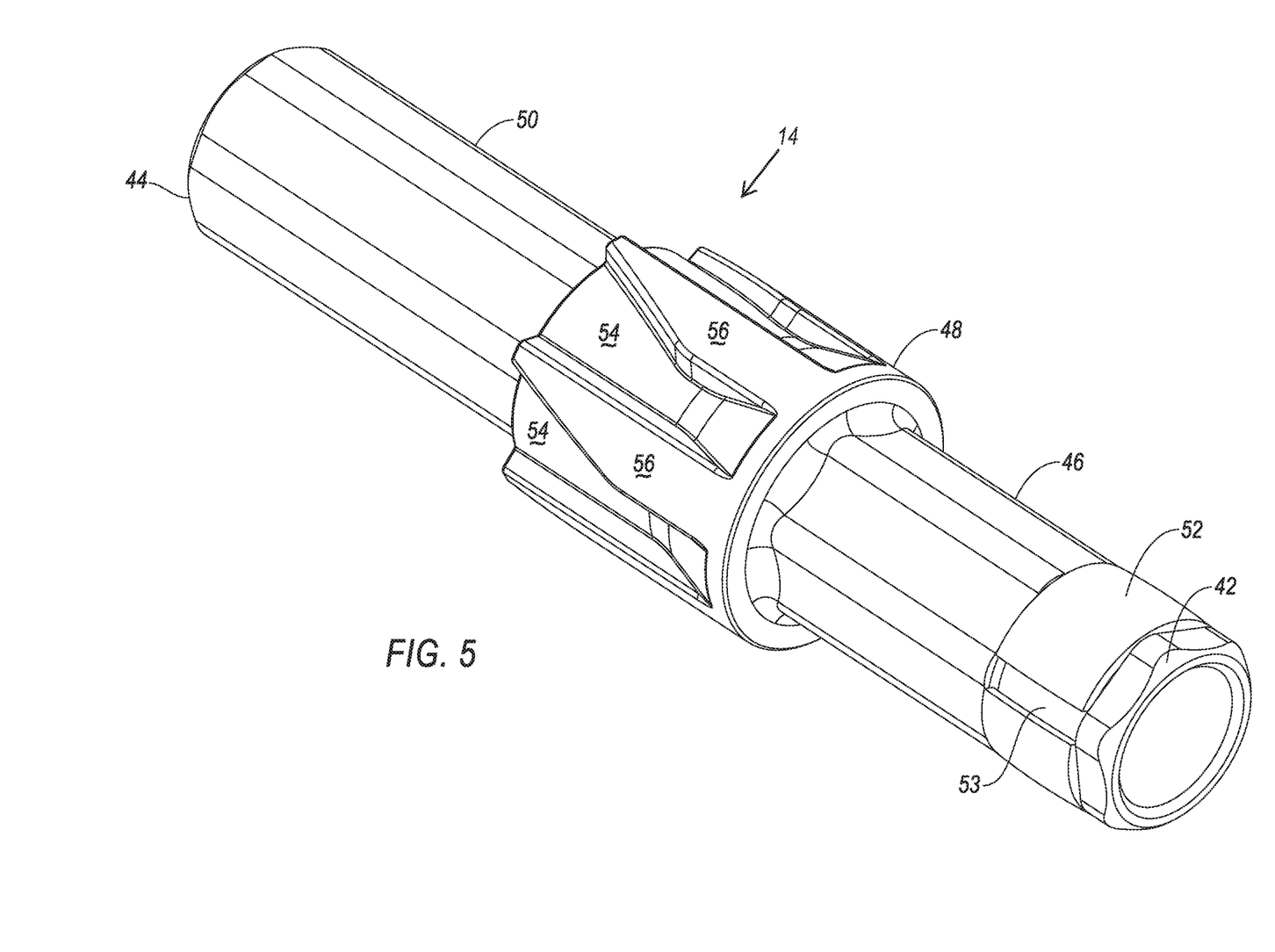
FIG. 5 provides a left isometric view of a spline coupler.
Figure 6A:
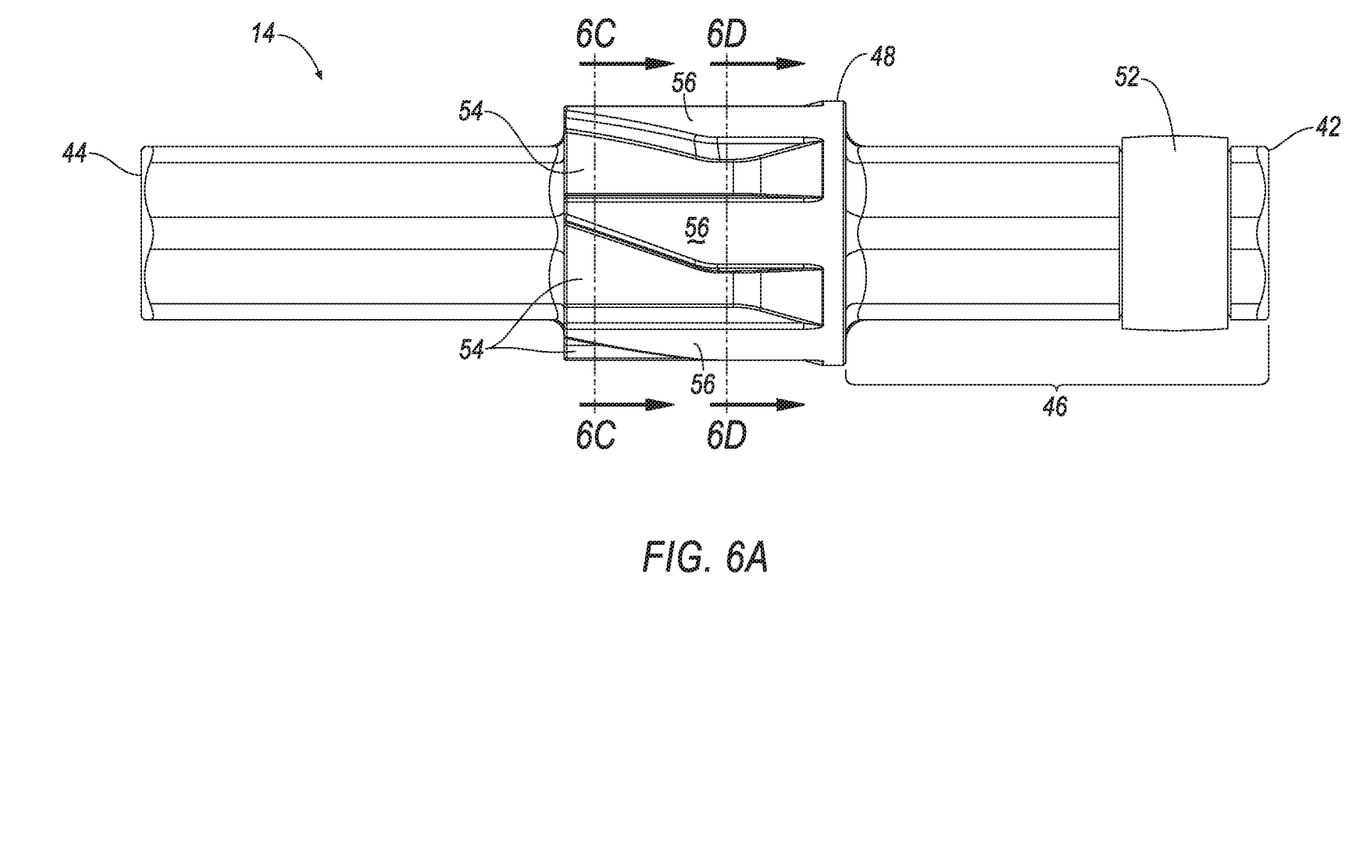
FIG. 6A provides an elevational view of the spline coupler of FIG. 5.
Figure 6B:
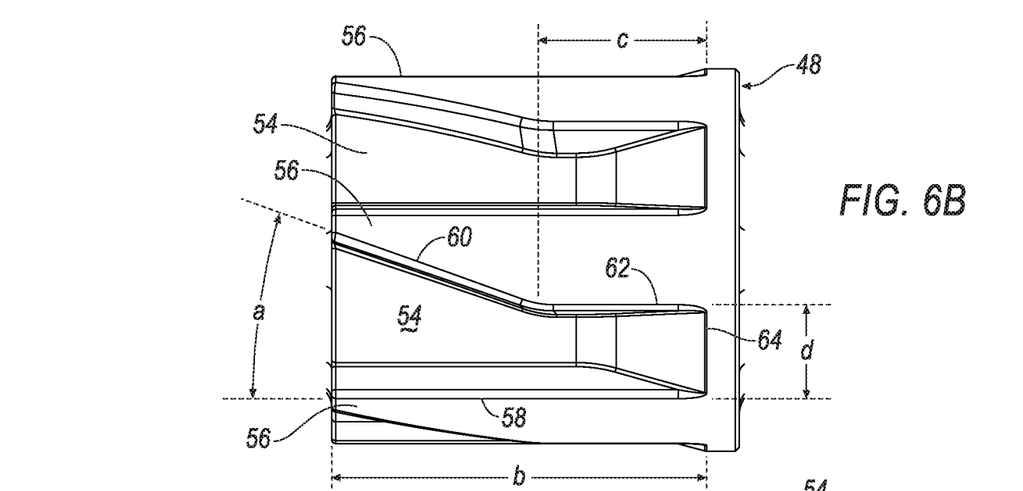
FIG. 6B provides a close-up elevational view of an intermediate section of the spline coupler of FIGS. 5 and 6A.
Figure 6C:
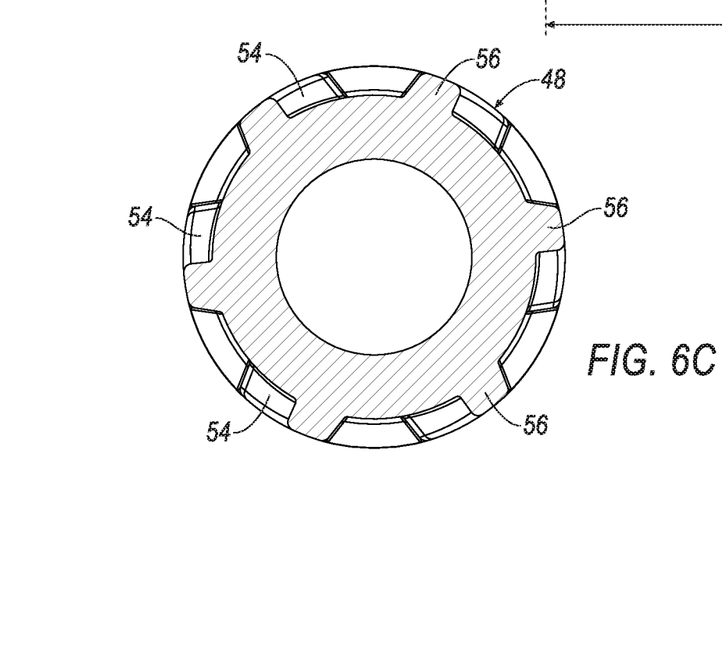
FIGS. 6C and 6D, respectively, provide transverse sections taken through the lines 6C-6C and 6D-6D in FIG. 6A.
Figure 6D:
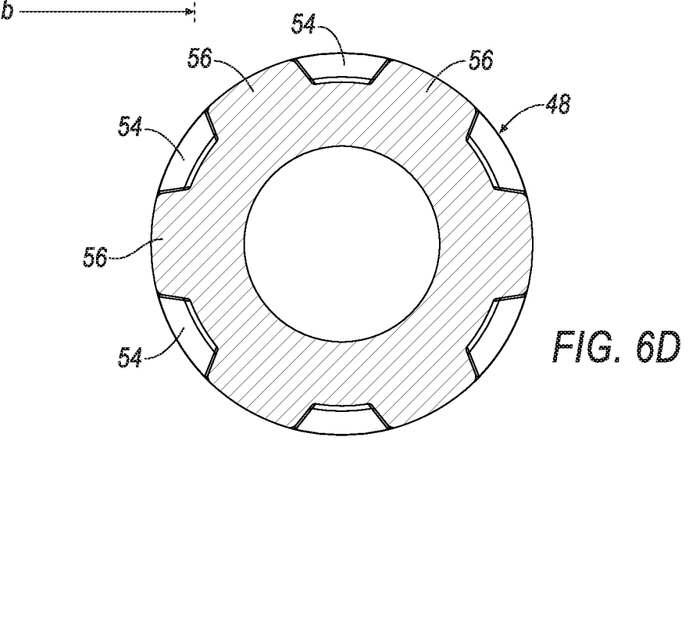

FIG. 5 provides a left isometric view of a spline coupler 14, in accordance with at least one embodiment, while FIG. 6A provides an elevational view of the spline coupler of FIG. 5. Further, FIG. 6B provides a close-up elevational view of an intermediate section of the spline coupler of FIGS. 5 and 6A. Additionally, FIGS. 6C and 6D, respectively, provide transverse sections taken through the lines 6C-6C and 6D-6D in FIG. 6A. Reference may continue to be made to all of FIGS. 5-6D.

In accordance with at least one embodiment, the spline coupler 14 includes an axial forward, or "top" end 42 that is configured to extend into (and engage with) interior portions of a drill steel, as well as an axial rearward, "bottom" end 44 that is configured to extend into (and engage with) either a chuck or a drill steel. Further, the spline coupler 14 may be defined via several sections as shown, progressing from forward end 42 to rearward end 44: a forward section 46; an intermediate section 48 and a rearward section 50. Intermediate section 48 may preferably be disposed, as shown, at or towards a central (or midway) portion along the overall longitudinal extent of spline coupler 14, but can be disposed essentially at any location (on spline coupler 14) deemed functionally suitable.

It should be appreciated that a spline coupler 14, substantially configured and shaped as shown (and, generally, as broadly contemplated herein), may be employed not only to interconnect a chuck and a drill steel (such as the chuck 12 and an adjacent drill steel 16 as shown in FIG. 1), but could also be employed to interconnect two adjacent drill steels 16 (e.g., as shown in FIG. 1). In the latter case, forward section 46 and rearward section 50 would each engage a respective drill steel, while intermediate section 48 would essentially remain unused (though while imparting additional strength to the coupler in the presence of bending stresses). Certainly, a component other than a spline coupler 14 (substantially configured and shaped as shown, or as broadly contemplated herein) may be used to interconnect two drill steels, but two or more spline couplers 14 indeed may be utilized in an assembly involving more than one drill steel (e.g., as shown in FIG. 1), thus according the spine couplers 14 a greater degree of versatility than might otherwise be the case. Further, a spline coupler 14 may even be configured to interconnect a drill steel and a roof drill bit, thus substituting for a "bit coupler" such as that indicated at 18 in FIG. 1.

Forward section 46 generally includes a plurality of sides for engaging an interior portion of a drill steel; here, six such sides are shown for the purpose of engaging with a hexagonal inner profile of a drill steel, but other configurations are conceivable. (Merely one illustrative example is shown via FIG. 5, wherein for forward section 46 a plurality of shallow, concave arcuate sides are interconnected via with shorter, convex arcuate corner portions, but it should be understood that a great variety of alternative configurations are conceivable.) As generally known, there may also be included a retainer ring, or "keeper ring" 52, within forward section 46, disposed in its own corresponding circumferential groove or recess 53. The removable ring 52 (e.g., formed from a suitable metal) helps to clamp the forward section 46 of coupler 14 into the interior (e.g., hexagonal inner profile) of a drill steel. As shown, the ring 52 (and its recess) may be located at an intermediate point between the forward end 42 and the intermediate section 48 of spline coupler 14, e.g., closer to the forward end 42.

Rearward section 50 is configured similarly to the bulk of forward section 46, to engage the interior surface of a drill steel and/or of a portion of a chuck. As such, rearward 50 section may end up being inserted into an internal bore portion of a chuck, such as the second bore portion 40 of chuck 12 shown in FIG. 4A; generally, such engagement will not result in torque transmission to the spline coupler 14 as much as from the splines 37 (or other protrusive elements) of chuck 12 to the intermediate section 48 of spline coupler 14 (e.g., in a manner to be described in more detail below). On the other hand, if the spline coupler 14 is used to interconnect two drill steels (as touched on further above), then the sides of rearward section 50 will indeed be used in torque transmission (e.g., to receive torque from compatible internal surfaces of a drill steel).

For its part, in accordance with at least one embodiment, intermediate section 48 generally assumes a greater outer diameter than the forward and rearward sections 46/50. (To help assist in providing mutual support between intermediate section 48 and each of the flanking sections 46/50, e.g., to help mitigate a risk of excess bending stresses, a transition portion—e.g., a "blended radius" portion, or what essentially amounts to a concavely curved collar or skirt portion—may be disposed, as shown, at the rearward end of forward section 46 and the forward end of section 50, respectively.) Also included in intermediate section 48 are a plurality of recesses (or grooves) 54 extending axially from a rear shoulder of intermediate section 48 over a given distance toward a front shoulder of intermediate section 48. In the present example, six recesses 54 are shown but it should be understood that essentially any suitable number may be provided. Further, the recesses 54 may preferably be distributed uniformly about a circumference of the intermediate section 48. In a manner to be appreciated more fully below, each of these recesses 54 may engage with, and accommodate, compatible splines of a chuck, such as the splines 37 of chuck 12 as shown in FIGS. 4A and 4B.

As also shown, a plurality of angled splines 56 may be distributed uniformly about a circumference of intermediate section 48, each one interposed between a pair of neighboring recesses 54. In a manner to be appreciated more fully below, each of these splines 56 may engage with, and be accommodated in, compatible recesses of a chuck, such as the recesses 38 of chuck 12 as shown in FIGS. 4A and 4B. It will also be appreciated from the ensuing discussion that this uniform distribution helps ensure automatic alignment of the spline coupler 14 with respect to a compatible chuck, in that an initial rotational position of the spline coupler 14 upon insertion, with respect to a central longitudinal axis of the spline coupler, need not be predetermined in order for the recesses and splines 54/56 to quickly engage with compatible splines and recesses of the chuck.

In accordance with at least one embodiment, and as illustrated more clearly in FIG. 6B, each recess 54 may be defined via several wall portions (which, by extension, essentially help define "edge portions" of adjacent splines 56). First, a longer axial wall portion 58 (having an axial length b) and an angled wall portion 60 form an angle a with respect to one another. (Preferably, a line which defines the angled wall portion 60 travels about a portion of the circumference of intermediate section 48 as shown, wherein its two-dimensional projection, e.g., as viewed in FIG. 6B, is linear and straight; the angle a may be understood as being measured with respect to a two-dimensional linear projection of both angled wall portion 60 and longer axial wall portion 58 alike.) A shorter axial wall portion 62 (having an axial length c), parallel to longer axial wall portion 58 and separated therefrom by a circumferential distance d, extends axially from an end of angled wall portion 60 (i.e., that end toward the forward or "top" end of intermediate section 48, toward the right in the drawing) and is interconnected with longer axial wall portion 58 via an end wall portion 64 (e.g., that can be straight when viewed in a two-dimensional projection). The straight end wall portion 64 is shown merely by way of illustrative example, and can be substituted with other configurations, e.g., an arcuate wall portion that can be semicircular shape when viewed in a two-dimensional projection.

Generally, it should be appreciated that the wall portions 58/60/62/64 of each recess 54, and the "floor" of the recess itself, may be configured in essentially any manner deemed suitable for production and/or operation. For instance, as shown, the axial wall portions 58 and 62 may be "vertical" in the sense of being aligned along a radial direction of spline coupler 14 (i.e., in a direction parallel to radii extending orthogonally from a central longitudinal/rotational axis of spline coupler 14); in accordance with at least one variant, however, either or both of these wall portions 58/62 may be oriented at an angle with respect to radii from the central longitudinal axis (essentially, at any angle and in any direction deemed suitable). As a transition between each wall portion 58/62 and a neighboring spline 56, there may be a bevel or (as shown) a convex corner radius in place of a "sharp" corner transition.

Similarly, the angled wall portion 60 may be "vertical", and thus oriented in parallel with respect to radii from the central longitudinal axis, or alternatively may be angled with respect to such a "vertical" direction. Again, as a transition between angled wall portion 60 and a neighboring spline 56, there may be a bevel or (as shown) a convex corner radius in place of a "sharp" corner transition. Further, as a transition between angled wall portion 60 and shorter axial wall portion 62 (when viewed at the external circumference of intermediate section 48, and projected two-dimensionally) there may be a convex corner radius instead of a "sharp" corner or vertex. For its part, the shorter end wall portion 64 may be oriented "vertically" in a manner similar to that just described for wall portions 58/60/62, or alternatively (and as shown in FIGS. 5, 6A and 6B) may assume a non-zero, non-vertical (e.g., "shallow") slope along an axial and radially inward direction, as a transition to a "floor" of the corresponding recess 54, or to a small, arcuate and concave transition portion that extends to a "floor" of recess 54.

In accordance with at least one embodiment, if spline coupler 14 is inserted axially into the chuck 12 shown in FIGS. 2-4B (to which reference can simultaneously be made here), it can be appreciated that an axial spline 37 of chuck 12 will enter a recess 54 and either contact angled wall portion 60 initially, or will immediately slide between axial wall portions 58 and 62. In the former instance, if (during the aforementioned axial insertion) the axial spline 37 contacts angled wall portion 60 initially, then angled wall portion 60 will guide further movement of the spline 37 such that it is directed to ultimately slide between axial wall portions 58 and 62, while promoting relative rotational displacement of the coupler 14 with respect to the chuck as well. In either instance, as noted heretofore, the annular shoulder at a lower axial end of chamber 39 can serve as a stop (i.e., a limit to axial movement) for the coupler 14. It can also be appreciated that similar action as just noted will also take place in parallel with respect to other pairs of axial splines 37 and recesses 54, thus affording a capability of automatic self-alignment of the spline coupler 14 and chuck 12 with respect to one another.

In accordance with at least one embodiment, angle a is preferably selected so as to be small enough to preserve sufficient width of splines 56 (as measured in a circumferential direction), to permit each spline 56 to adequately absorb torque transmitted from splines of the chuck 12. In other words, an angle a that is too steep (i.e., of larger value) may result in weaker torque absorption capabilities of the splines 56. An angle a that is too shallow (i.e., of smaller value), on the other hand, will inhibit the automatic alignment capability discussed herein; in other words, there will be less of a circumferential "range" for splines 37 of the chuck 12 to be received by recesses 54. Dimension c may be tailored, as appropriate, to help define angle a.

Dimension b may be tailored, relative to an overall axial length of intermediate section 48, so as to help ensure that the entire intermediate section 48 is sufficiently strong to carry torque transmitted from the chuck 12. Generally, the splines 56 may each converge to a region of minimum width (as measured in a circumferential direction), at the rearward end of intermediate section 48 (i.e., to the left in FIG. 6B). These regions of minimum width may be blunt (i.e., tapering to some tangible width, rather than a sharp "point"), and may possibly be rounded; either way, this minimum width should preferably be such as to help easily accommodate a spline 37 of chuck 12 within an adjacent recess 54. Dimension d may be tailored in a manner to adequately receive therein a corresponding spline 37 of chuck 12 and to permit transmission of torque from the spline 37 to intermediate section 48 (e.g., via longer axial wall portion 58).

It should be appreciated that other configurations are possible for intermediate section 48, in a manner to provide substantially an analogous function as described above. For instance, wall portion 60 need not necessarily be angled (when viewed in a two-dimensional projection), but could assume another shape, e.g., curved convexly, that still permits guidance and receipt of a spline 37 (of chuck 12) into a recess 54.

As noted above, in accordance with at least one embodiment, the recesses 54 and splines 56 are uniformly distributed about a circumference of intermediate section 48. In the present example, six of each are provided, but other quantities of the recesses 54 and splines 56 can be provided in at least one variant (e.g., four or five each, or less, of the recesses 54 and splines 56, or seven or eight or more each of the recesses 54 and splines 56). In viewing FIGS. 6C and 6D, it can be appreciated that in progressing from a lower to an upper portion of the intermediate section 48, within the angled portions of the recesses 54, the circumferential width of each recess 54 decreases, and that of each spline 56 increases.

Figure 7:
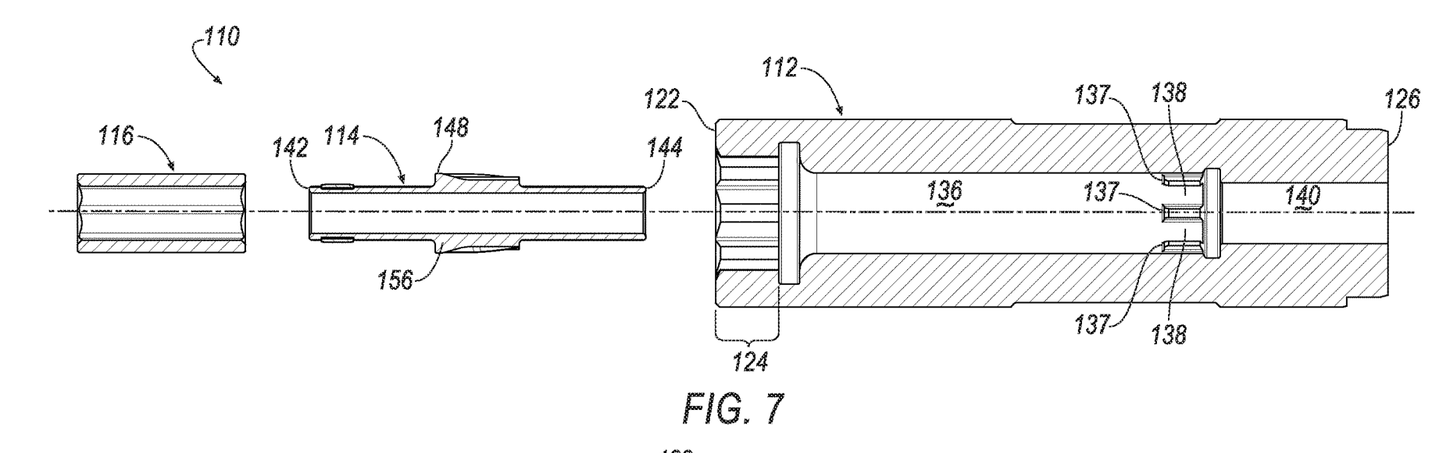
FIG. 7 provides an exploded, axial cross-sectional view of drill steel, spline coupler and chuck components of a roof drill bit assembly.
Figure 8:
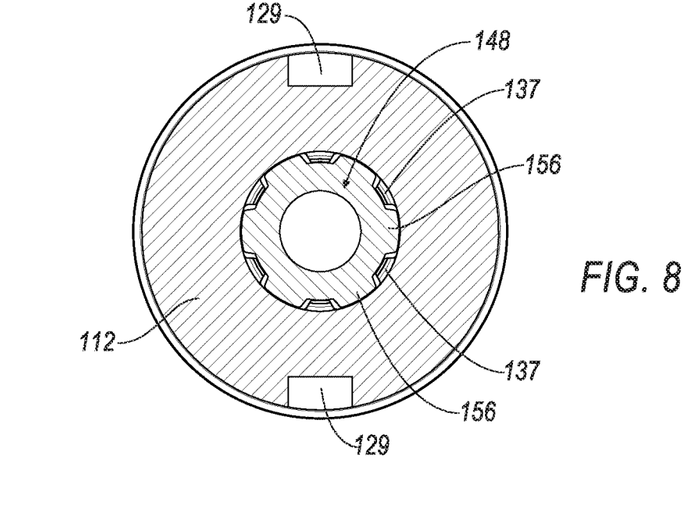
FIG. 8 provides a transverse cross-sectional view of the roof drill bit assembly of FIG. 7, showing an interface between splines on the spline coupler with splines on the chuck.

FIG. 7 provides an exploded, axial cross-sectional view of drill steel (116), spline coupler (114) and chuck (112) components of a roof drill bit assembly 110, while FIG. 8 provides a transverse cross-sectional view of the roof drill bit assembly of FIG. 7 as assembled, showing an interface between splines on the spline coupler with splines on the chuck. Reference may continue to be made to both of FIGS. 7 and 8; further, reference numerals indicating similar or analogous components are advanced by 100 with respect to FIGS. 1-6D.

As shown, a chuck 112, including a forward (122) and rearward (124) end thereof, may be configured to accommodate a spline coupler 114, wherein a rearward end 144 of the spline coupler 114 is inserted into the forward end 122 of the chuck 112. Recesses and angled splines (156) on the spline coupler 114 may then engage and interact with splines 137 and recesses 138 in the chuck 112, in a manner similar to that discussed above with respect to FIGS. 1-6D. FIG. 8, for its part, illustrates full engagement and interconnection of the chuck 112 and the spline coupler 114 in such a manner with one another, i.e., where splines 156 of coupler 114 (disposed on the intermediate section 148 thereof) are interposed between neighboring splines 137 of chuck 112. In essentially any suitable manner, rearward end 124 of chuck 112 may be mounted on, or engaged with, a rotational drive.

Further, a forward end 142 of the spline coupler 114 can be inserted into the interior of a drill steel 116 in a manner similar to that discussed above with respect to FIGS. 1-6D. By way of illustrative and non-restrictive example, the spline coupler 114 may include, at least toward its forward end 142, a generally six-sided configuration about the external circumference of coupler 114 that engages with a hexagonal inner profile of drill steel 116 in a manner to be able to rotationally drive the latter.

Beyond the specific examples discussed herein, a great variety of alternative and variant configurations are conceivable in accordance with at least one embodiment. For instance, the splines and recesses used on a chuck and a spline coupler may be "reversed". Thus, a pattern of angled splines and recesses (e.g., as indicated at 56/54 in FIGS. 6A and 6B) may be realized over an internal circumference of a chuck, while a pattern of "axial" splines and recesses (e.g., as indicated at 37/38 in FIGS. 4A and 4B) may be realized over an outer circumference of a spline coupler.

Several advantages may be provided in accordance with at least one embodiment as broadly contemplated herein. For instance, it can be appreciated that configurations of splines and recesses, on a coupler and chuck alike, as broadly contemplated herein, can permit automatic alignment of a coupler with respect to a chuck while still maintaining sufficient strength to (rotationally) drive a drill steel engaged with the coupler. As noted heretofore, a chuck with a cylindrical internal profile, as opposed to a hexagonal or other polygonal internal profile, will help more readily accommodate and support drill steels with a cylindrical outer profile. Hands-free operation is also afforded with a tight fit between a coupler, chuck and drill steel, such that an operator does not particularly need to guide one or more drill steels into the roof being drilled into.

In brief recapitulation, it may be appreciated from the foregoing that, in accordance with at least one embodiment as broadly contemplated herein, an assembly includes a first member (e.g., a chuck) with torque transmission elements (e.g., protrusive elements and/or recesses), and a coupler which connects together, in a rotatably driving relationship, the first member and a second member (e.g., a drill steel). The coupler includes an intermediate section disposed between an axial forward end and an axial rearward end of the coupler, a forward section extending between the intermediate section and the axial forward end, and a rearward section extending between the intermediate section and the axial rearward end. The intermediate section includes torque transmission elements (e.g., protrusive elements and/or recesses) for engaging with the torque transmission elements of the first member, to facilitate transmission of torque from the first member to the coupler. The torque transmission elements of the coupler are automatically brought into a torque-transmitting relationship with the torque transmission elements of the first member when the coupler is engaged with the first member (e.g., when the coupler is inserted axially into the first member, such as into a longitudinal bore of the first member).

Further, in general recapitulation, an assembly as broadly contemplated herein may include: a first member comprising torque transmission elements; a coupler for connecting together, in a rotatably driving relationship, the first member and a second member; the coupler comprising torque transmission elements for engaging with the torque transmission elements of the first member, to facilitate transmission of torque from the first member to the coupler; wherein the torque transmission elements of the coupler are automatically brought into a torque-transmitting relationship with the torque transmission elements of the first member when the coupler is engaged with the first member. In accordance with at least one variant of embodiments otherwise described and illustrated herein, the torque transmission elements of the coupler need not necessarily be disposed on an "intermediate portion" of the coupler, and instead could be disposed generally toward or at one or the other axial end of the coupler, in a manner sufficient for carrying out the functions of torque transmission generally described herein. This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An assembly comprising:
   a first member comprising torque transmission elements and a longitudinal bore disposed therein, wherein the torque transmission elements of the first member are disposed within the longitudinal bore;
   a coupler for connecting together, in a rotatably driving relationship, the first member and a second member;
   the coupler comprising:
   an axial forward end and an axial rearward end;
   an intermediate section disposed between the axial forward end and the axial rearward end;
   a forward section extending between the intermediate section and the axial forward end; and
   a rearward section extending between the intermediate section and the axial rearward end;
   the intermediate section comprising torque transmission elements disposed at an outer circumference of the intermediate section for engaging with the torque transmission elements of the first member to facilitate transmission of torque from the first member to the coupler;
   wherein the torque transmission elements of the coupler are automatically brought into a torque-transmitting relationship with the torque transmission elements of the first member when the coupler is inserted axially into the longitudinal bore of the first member.

2. The assembly according to claim 1, wherein the torque transmission elements of the first member are distributed uniformly about an inner circumference of the longitudinal bore of the first member.

3. The assembly according to claim 1, wherein:
   the first member comprises an axial forward end and an axial rearward end;
   the longitudinal bore of the first member comprises a first bore portion, extending from the torque transmission elements toward the axial forward end of the first member; and
   the first bore portion of the first member comprises a cylindrical inner profile.

4. The assembly according to claim 3, wherein the torque transmission elements of the coupler comprise recesses.

5. The assembly according to claim 4, wherein the torque transmission elements of the first member comprise protrusive elements which engage with the recesses of the coupler.

6. The assembly according to claim 5, wherein the protrusive elements of the first member comprise splines which engage with the recesses of the coupler, each of the splines of the first member having an elongated axial dimension.

7. The assembly according to claim 6, wherein each the splines of the first member:

comprises opposite axial ends; and has a constant cross-section, with respect to a circumferential direction of the first member, from one of the axial ends to the other of the axial ends.

8. The assembly according to claim 1, wherein the torque transmission elements of the coupler comprise protrusive elements.

9. The assembly according to claim 8, wherein the torque transmission elements of the first member comprise recesses which engage with the protrusive elements of the coupler.

10. The assembly according to claim 9, wherein the protrusive elements of the coupler comprise splines which engage with the recesses of the first member, each of the splines having an elongated axial dimension.

11. The assembly according to claim 10, wherein the splines of the coupler are each defined by at least one edge portion which is oriented at a non-zero acute angle with respect to the central longitudinal axis.

12. The assembly according to claim 10, wherein the torque transmission elements of the coupler comprise recesses disposed between the splines.

13. The assembly according to claim 12, wherein each of the recesses of the coupler:

comprises opposite axial ends; and varies in width, as measured in a circumferential direction of the coupler, from one of the axial ends to the other of the axial ends.

14. The assembly according to claim 12, wherein at least one of the recesses of the coupler comprises:

an angled wall portion; and a first axial wall portion, which extends in a direction parallel to the central longitudinal axis;

wherein the angled wall portion and the first axial wall portion, when viewed in a two-dimensional projection, form a non-zero acute angle with respect to one another.

15. The assembly according to claim 14, wherein:

the angled wall portion extends from a first end, at a rearward end of the intermediate portion of the coupler, to a second end;

the at least one recess comprising a second axial wall portion which:

runs parallel to the first axial wall portion; and extends from the second end of the angled wall portion.

16. The assembly according claim 10, wherein the splines of the coupler are distributed uniformly about a circumference of the intermediate section.

17. The assembly according to claim 9, wherein the recesses of the first member are each of constant width, as measured in a circumferential direction of the first member.

18. The assembly according to claim 1, wherein:

each of the forward section, the intermediate section and the rearward section of the coupler is defined by a maximum outer diameter; and the maximum outer diameter of the intermediate section is greater than that of both the forward section and the rearward section.

19. The assembly according to claim 1, wherein:

the forward section of the coupler comprises a multi-sided outer profile for engaging with a compatible inner profile of the second member; and the rearward section of the coupler comprises a multi-sided outer profile for engaging with a compatible inner profile of a drill steel.

20. The assembly according to claim 1, wherein the first member comprises a chuck which engages with a rotational drive and transmits torque between the rotational drive and the coupler.

21. A coupler for connecting together, in a driving relationship, a first member and a second member in a rotatable cutter assembly, the coupler comprising:

an axial forward end and an axial rearward end;

an intermediate section disposed between the axial forward end and the axial rearward end;

a forward section extending between the intermediate section and the axial forward end;

a rearward section extending between the intermediate section and the axial rearward end;

the intermediate section comprising torque transmission elements disposed at an outer circumference of the intermediate section for engaging with compatible elements of the first member, to facilitate transmission of torque from the first member to the coupler;

wherein the torque transmission elements automatically are brought into a torque-transmitting relationship with torque-transmitting elements disposed within a longitudinal bore of the first member when the coupler is inserted axially into the longitudinal bore of the first member.

22. The coupler according to claim 21, wherein the torque transmission elements of the coupler comprise:

recesses; and protrusive elements disposed among the recesses.

23. The coupler according to claim 22, wherein:

the protrusive elements comprise splines which engage with compatible recesses of the first member, each spline having an elongated axial dimension; and the splines are each defined by at least one edge portion, the at least one edge portion comprising a portion extending in a direction which is not parallel to the central longitudinal axis, when viewed in a two-dimensional projection.

24. An assembly comprising:

a first member comprising torque transmission elements and a longitudinal bore disposed therein, wherein the torque transmission elements of the first member are disposed within the longitudinal bore;

a coupler for connecting together, in a rotatably driving relationship, the first member and a second member;

the coupler comprising torque transmission elements disposed at an outer circumference of the coupler for engaging with the torque transmission elements of the first member, to facilitate transmission of torque from the first member to the coupler;

wherein the torque transmission elements of the coupler are automatically brought into a torque-transmitting relationship with the torque transmission elements of the first member when the coupler is inserted axially into the longitudinal bore of the first member.

* * * * *